United States Patent

[11] 3,561,474

[72] Inventor Lawrence W. Langley
 Corning, N.Y.
[21] Appl. No. 787,631
[22] Filed Dec. 30, 1968
[45] Patented Feb. 9, 1971
[73] Assignee Corning Glass Works
 Corning, N.Y.
 a corporation of New York

[54] SERVOVALVE OUTPUT FLUID VELOCITY INDICATOR
 2 Claims, 1 Drawing Fig.
[52] U.S. Cl. ................................................ 137/557,
 137/625.63, 137/625.66
[51] Int. Cl. ................................................ F15c 3/02,
 F15b 13/042
[50] Field of Search .......................................... 137/625.63,
 625.60, 625.69, 82, 557; 235/201

[56] References Cited
 UNITED STATES PATENTS
 3,340,896 9/1967 Mon ............................. 137/624.13
 3,447,555 6/1969 Jenney ......................... 137/625.64X

*Primary Examiner*—Alan Cohan
*Attorneys*—Clarence R. Patty, Jr. and William J. Simmons, Jr.

ABSTRACT: A system for providing digital fluidic signals which are indicative of the velocity of hydraulic fluid flowing through a servovalve. A shaft connected to the servovalve spool has a plurality of slots therein which are disposed adjacent to a plurality of back pressure sensors. Different locations of this spool cause correspondingly different digital fluidic signals to be generated by the back pressure sensors.

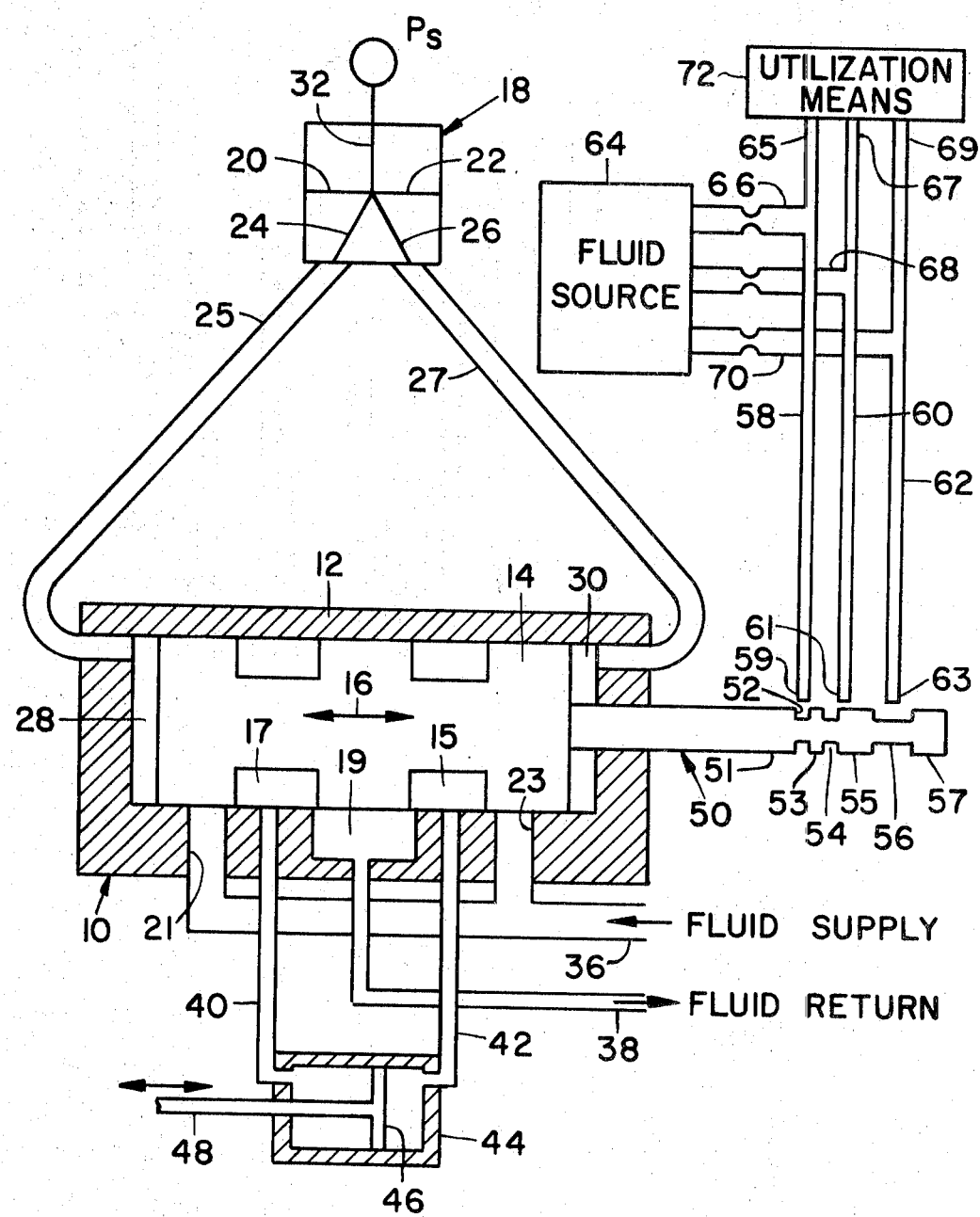

SERVOVALVE OUTPUT FLUID VELOCITY INDICATOR

BACKGROUND OF THE INVENTION

This invention relates to a device for providing digital fluidic signals which are related to the velocity with which hydraulic fluid flows from a hydraulic servovalve. These digital fluidic signals are also related to the velocity of the output device driven by the servovalve.

High power hydraulic energy is often used in machine control systems for such functions as tool position and speed control, conveyor speed control and the like. Information signals fed into such a system cause initial motion of the parts; feedback signals representing the position and/or velocity of these parts must be coupled to control circuits to permit the accurate positioning and stopping of such parts. Prior art systems of the above type involving a conversion of signals from one form to another suffer from a consequent loss of accuracy in the signal conversion. For example, when a conventional electrohydraulic servovalve is provided with fluidic control, the low level fluidic signal must first be converted to an electrical signal which can be utilized by the valve. The accuracy of the digital fluidic signal can be lost in the fluidic-to-electrical signal conversion.

With the increasing use of digital fluidic systems in machine control applications, it has become desirable to generate fluidic signals which represent such machine functions as velocity and position. Furthermore, the use of digital fluidic control systems for machine tool control has made it advantageous to directly control servovalves by fluid amplifiers.

SUMMARY OF THE INVENTION

It is therefore an object of this invention to provide a system for generating a digital fluidic signal which is related to the velocity with which a hydraulic fluid flows through a servovalve and which is therefore related to the velocity of a device driven by the hydraulic fluid.

Another object of this invention is to provide means for directly actuating a hydraulic servovalve in response to a relatively low pressure fluidic control signal, thereby eliminating errors associated with signal conversion.

Briefly, this invention relates to a hydraulic system comprising a servovalve having a movable spool, a displacement of which from a central position is an indication of the direction and velocity of a hydraulic fluid flowing therethrough. At least one back pressure sensor having a sensing end and an output end, and a member having at least one slot therein are so disposed relative to each other that relative movement between the member and the back pressure sensor causes the groove and the lands adjacent thereto to cover and uncover the sensing end of the back pressure sensor. Means responsive to the movement of the spool causes relative movement between the back pressure sensor and the slotted member, whereby a digital fluidic signal produced by the back pressure sensor is an indication of the velocity of the hydraulic fluid flowing through the valve.

BRIEF DESCRIPTION OF THE DRAWING

The sole FIGURE is a schematic representation of a preferred embodiment of the present invention.

DETAILED DESCRIPTION

Referring to the FIGURE there is shown a conventional zero-lap servovalve 10 which consists of a valve body 12 and a spool 14 which is disposed therewithin and which is free to move several thousandths of an inch in either direction represented by the double headed arrow 16. The spool has a pair of annular slots 15 and 17 which are so disposed with respect to a slot 19 in the body 12 that the slots 17 and 19 communicate when the spool moves to the right, as viewed in the FIGURE, and the slots 15 and 19 communicate when the spool moves to the left. Hydraulic fluid under pressure is supplied through a pipe 36 to two holes 21 and 23 which are so disposed in the body 12 that the hole 21 communicates with the slot 17 when the spool moves to the left, and the hole 23 communicates with the slot 15 when the spool moves to the right. A fluid return pipe 38 is connected to the slot 19. Pipes 40 and 42 connect the output hydraulic fluid from the valve 10 to a fluid-to-mechanical motion transducer such as a piston cylinder 44 within which is located a piston 46 to which a rod 48 is connected.

The heretofore described conventional valve operates as follows. Displacement of the spool 14 to the right, for example, causes the slot 15 to communicate with the hole 23, thereby permitting hydraulic fluid under pressure to flow from the pipe 36, through the slot 15 and into the pipe 42. In the embodiment shown, this fluid causes a displacement of the piston 46 to the left. The return path for fluid being forced out of the cylinder 44 is through the pipe 40, the slots 17 and 19 and the pipe 38. The velocity of the hydraulic fluid flowing in the pipes 40 and 42, and therefore the velocity of the rod 48, is related to the displacement of the spool 14 from its central position, since a greater displacement provides an increased area through which the fluid can flow from the hole 23 to the slot 15. Since the relationship between the velocity of the rod 48 and the displacement of the spool 14 from its central position can easily be determined, the rod 48 can be caused to move at any given velocity by displacing the spool 14 a predetermined distance from center.

In accordance with the present invention fluid operated means are provided for determining the position of the spool 14. A shaft 50, which is connected to an end of the spool 14 and extends through a hole in the body 12, has a plurality of annular slots 52, 54 and 56 spaced along the length thereof. For the sake of clarity, the sizes of the slots 52, 54 and 56 are greatly exaggerated. A plurality of back pressure sensors comprising pipes 58, 60 and 62 have their sensing ends 59, 61 and 63 disposed in spaced relationship adjacent the shaft 50. A fluid source 64 is connected to the pipes 58, 60 and 62 by a plurality of pipes 66, 68 and 70, respectively, each of which contains a restrictor. The output ends 65, 67 and 69 of the pipes 58, 60 and 62 are connected to utilization means 72. The lengths of the slots 52, 54 and 56 in the direction of the longitudinal axis of the shaft 50, the lengths of the lands adjacent these slots and the relationships of the slots with respect to the sensing ends 59, 61 and 63 are determined in accordance with a predetermined digital code. As the spool 14 moves to the right or left, the sensing ends 59, 61 and 63 become covered or uncovered by the lands 51, 53, 55 and 57 or the grooves 52, 54 and 56, thereby developing fluidic digital indications of spool position.

When the spool 14 is in the position illustrated in the FIGURE, the back pressure sensing ends 59, 61 and 63 are so disposed with respect to the slots 52, 54 and 56 that low pressure fluid signals are transmitted to the utilization means 72 from the output ends 65 and 69 while a high pressure signal is transmitted thereto by the output end 67 since the sensing end 61 of this pipe is covered by land 55. A movement of the spool 14 one increment to the left will cause the land portion 53 to cover back pressure sensing end 59 causing a high pressure fluid signal to be transmitted from the output end 65 to the utilization means 72, the fluid signals transmitted by the back pressure sensors 60 and 62 remaining the same. Thus, each movement of the shaft 50, a distance equal to the width of the slot 52, will cause a different digital fluidic signal to be generated by the encoding means.

Since the position of the spool 14 is indicated by digital fluidic signals, it is advantageously displaced from its central position by a proportional fluid amplifier 18 having a power stream passage 32 connected to a fluid source $P_s$, control passages 20 and 22 and output passages 24 and 26. The two output passages 24 and 26 are respectively connected by two pipes 24 and 26 to a pair of cavities 28 and 30 defined by the end portions of the spool 14 and the adjacent portions of the body 12.

If motion toward the left is required of the rod 48, a control signal is applied to the control passage 22 so that the power stream flows mainly from the output passage 24, through the pipe 25 and into the cavity 28. This will move the spool 14 toward the right until the back pressure sensing end 59 becomes covered and the sensing end becomes uncovered, indicating that the rod 48 is moving toward the left at a velocity increment of one unit. If a higher velocity increment is required, the fluid amplifier 18 remains in the condition previously described and the spool will be driven further to the right until the digital outputs from the back pressure sensors indicate that the rod 48 is moving at a higher velocity increment. If this higher velocity increment is sufficient for the operation being performed by the rod 48, the control signal is removed from the control passage 22 of the fluid amplifier and the power stream divides and delivers equal flow to both of the output passages 24 and 26. The spool 14 remains in its displaced position so that hydraulic fluid from the supply pipe 36 will flow through the hole 23, the slot 15 and the pipe 42, thereby continuing to drive the piston 46 to the left. At the same time the exhaust hydraulic fluid will flow from the cylinder 44 through the pipe 40, the slots 17 and 19 and the pipe 38. To arrest the motion of the rod 48, a control signal is applied to the control passage 20 of the fluid amplifier diverting the power stream to the output passage 26, through the pipe 27 and into the cavity 30, thus driving the spool toward the left. When the spool reaches its central position within the body 12, the shaft 50 will achieve the position shown in the FIGURE so that the utilization means 72 will receive a digital fluidic indication of the spool's central location. Means responsive to this digital fluidic signal can then cause the control signal which has been applied to the passage 20 to cease, thereby causing the fluid amplifier to deliver equal pressures to the cavities 28 and 30, and thereby stopping the spool 14.

While the present invention has been particularly shown and described with reference to a preferred embodiment, it will be understood by those skilled in the art that various changes in the form and details may be made therein without departing from the spirit and scope of the invention. For example, the cylinder 44 could be replaced by a hydraulic motor, the angular velocity of which can be determined by the digital fluidic signals generated by the back pressure sensors. Furthermore, the fluid amplifier 18 may be of the bistable type if means are provided for turning off the power stream when the spool has been displaced to its desired position.

I claim:

1. A hydraulic system comprising:

a servovalve having a movable spool, the displacement of which from a central position is an indication of the direction and velocity of hydraulic fluid flowing therethrough;

a shaft attached to one end of said spool, said shaft having a plurality of longitudinally spaced grooves in the surface thereof;

a plurality of back pressure sensors, each having a sensing end and an output end, said sensing ends being disposed adjacent said surface so that relative movement between said shaft and said sensors causes said grooves and the lands adjacent thereto to cover and uncover the sensing ends of said back pressure sensors, whereby a digital fluidic signal produced by said back pressure sensors is an indication of the direction and velocity of said hydraulic fluid flow; and utilization means connected to the output ends of said back pressure sensors.

2. A servovalve in accordance with claim 1 which further includes a fluid amplifier, the output passages of which are connected to said servovalve, said spool being moved by an unequal flow of fluid from said output passages to said valve.